US007998253B2

(12) United States Patent
Gregg (10) Patent No.: US 7,998,253 B2
(45) Date of Patent: Aug. 16, 2011

(54) AIRFLOW REDUCING AND REDIRECTING ARRANGEMENT FOR INDUSTRIAL BAGHOUSE

(75) Inventor: William W. Gregg, Basking Ridge, NJ (US)

(73) Assignee: Menardi-Mikropul LLC, Charlotte, NC (US)

( * ) Notice: Subject to any disclaimer, the term of this patent is extended or adjusted under 35 U.S.C. 154(b) by 470 days.

(21) Appl. No.: 12/170,799

(22) Filed: Jul. 10, 2008

(65) Prior Publication Data
US 2009/0020011 A1 Jan. 22, 2009

Related U.S. Application Data

(60) Provisional application No. 60/950,682, filed on Jul. 19, 2007.

(51) Int. Cl.
*B01D 46/02* (2006.01)
(52) U.S. Cl. ............................ 95/286; 55/341.1; 55/418
(58) Field of Classification Search .................... 55/302, 55/283, 294, 341.1, 484, 334, 326, 418, 444; 95/279, 280, 286
See application file for complete search history.

(56) References Cited

U.S. PATENT DOCUMENTS

| 3,425,189 | A | | 2/1969 | Haselmayer |
| 3,739,557 | A | | 6/1973 | Anderson et al. |
| 3,831,350 | A | | 8/1974 | Gilles et al. |
| 3,831,354 | A | | 8/1974 | Bakke |
| 3,907,529 | A | * | 9/1975 | Borsheim ........................ 55/337 |
| 3,926,595 | A | | 12/1975 | Böckman |
| 4,213,766 | A | | 7/1980 | Wyatt |
| 4,227,903 | A | | 10/1980 | Gustavsson et al. |
| 4,521,231 | A | * | 6/1985 | Shilling ........................... 55/302 |
| 4,544,383 | A | | 10/1985 | Haselmaker |
| 4,655,804 | A | * | 4/1987 | Kercheval et al. .............. 55/324 |
| 4,799,943 | A | | 1/1989 | Giusti et al. |
| 4,883,509 | A | * | 11/1989 | Giusti et al. ..................... 55/326 |
| 4,883,510 | A | * | 11/1989 | Giusti et al. ..................... 55/326 |
| 5,030,261 | A | * | 7/1991 | Giusti et al. ..................... 55/326 |
| 5,158,580 | A | * | 10/1992 | Chang ............................... 95/70 |
| 5,855,649 | A | * | 1/1999 | Durham et al. ................... 95/71 |
| 6,544,317 | B2 | * | 4/2003 | Miller ............................... 95/63 |
| 7,563,295 | B2 | * | 7/2009 | Andersen ......................... 55/302 |

OTHER PUBLICATIONS

Examiner's report dated Oct. 30, 2009 for Australian Patent Application No. 2008203160.

* cited by examiner

*Primary Examiner* — Duane Smith
*Assistant Examiner* — Minh-Chau Pham
(74) *Attorney, Agent, or Firm* — Myers Bigel Sibley & Sajovec, PA (57) ABSTRACT

An air filtering unit for a factory includes: an entry duct; a flow expander section fluidly connected with the entry duct, the flow expander section including a flow distribution unit and a flow velocity reduction unit; a filter unit fluidly connected with the flow expander section, the filter unit having a plurality of filter bags, the filter bags being suspended from a tube sheet; and an exit duct fluidly connected with the filter unit. The flow distribution unit includes a series of flow distribution members positioned along a flow path, the flow distribution unit located and configured to substantially equally distribute an airstream along the length of the flow axis into a plurality of divided substreams. The flow velocity reduction unit includes a plurality of flow reduction members, each of the flow reduction members positioned and configured to confront at least one of the divided substreams and reduce the flow velocity thereof.

23 Claims, 7 Drawing Sheets

AIRFLOW REDUCING AND REDIRECTING ARRANGEMENT FOR INDUSTRIAL BAGHOUSE

RELATED APPLICATION

This application claims the benefit of U.S. Provisional Patent Application No. 60/950,682, filed Jul. 19, 2007 in the U.S. Patent and Trademark Office, the disclosure of which is incorporated herein in its entirety by reference.

FIELD OF THE INVENTION

This invention relates generally to apparatus for filtering a gas stream, and more particularly to apparatus for filtering the particulates from a gas stream.

BACKGROUND OF THE INVENTION

It has long been recognized that control of a gas stream as the gas stream is introduced into a dust collecting apparatus can materially contribute to increased efficiency of operation and extended operating life of the gas treating components thereof. One area of preferential concern has been in the industrial gas filtration field, and particularly in the fabric filter dust collector field. One type of such fabric filter dust collector, also called a "baghouse", typically employs a large number of tubular fabric filters suspended from a tube sheet and interposed in the path of a particulate-laden gas stream to effect the separation of the particulate matter from the gas. In essence, as the gas traverses the fabric filter media in its passage from the dirty air plenum to the clean air plenum portion of the filter housing, the filters trap the particulate matter on the outside of the bags. The clean gas then flows from the inside of the bags through outlets in the tube sheet and into an exhaust manifold.

In this type of dust collector, a particulate laden gas stream conventionally enters the filter housing through an upper sidewall portion of the collector housing defining at least a portion of the perimeter of the dirty air plenum. The particulate matter borne by the incoming gas stream normally accumulates on the outer surface of the bag and, unless removed by dislodgement, results in a progressive increase in pressure drop across the filter media and in a concomitant reduction in the rate of gas flow through the filter media. In order to avoid excessive particulate accumulation on the outer surface of the filter media, the filter media is periodically cleaned by utilization of various known techniques, such as by pulse jet or reverse flow cleaning or by bag shaking. The outcome of such a cleaning operation is that a large part of the accumulated particulates are induced to drop off the filter media surface and fall downwardly, under the influence of gravity, toward and into a collection hopper.

In most industrial fabric filter installations of the type described above, the particulate bearing gas stream approaches the filter through a delivery or conveying conduit having a cross-sectional area sized to effect gas stream displacement at sufficiently high velocities, usually in the order of 3500-4000 feet/min., to assure maintaining the particulate matter in suspended entrained condition therein. However, it has been recognized that high efficiency—low loss filter operation and increased operating life of the filter components is dependent, at least in substantial part, on an equable distribution of deposited particulates on all the available filter media surfaces; on minimization, if not avoidance, of turbulence in gas flow within the dirty air plenum; on minimization of particulate re-entrainment during or after filter media cleaning; and on minimization of localized wear and abrasion of filter components. As is apparent, a high velocity gas stream is basically antithetical to the desired optimum parameters of gas stream displacement within the filter housing. Reduction of the velocity of the air stream conventionally employs transition ducting and the interposition of turning vanes, baffle plates and related gas flow direction and velocity modifiers to the end of hopefully effecting a more equable distribution of the incoming gas steam relative to the available filter media surface and a marked reduction in its approach velocity.

In addition to the foregoing, achieving optimum operating parameters for the introduction of a particulate bearing gas stream into a dust collector is often complicated, if not effectively precluded, by physical restraints at the installation site. Among such physical restraints may be a less than adequate area for installation, the presence of duct work, piping, support columns, walls, catwalks and other impediments to ideal installation conditions.

The transition of the shape and velocity of the incoming particulate bearing gas stream to the desirable flow conditions within the fabric filter media housing has been a long-standing problem in this field. Many expedients, such as expansion of conduit dimension and the use of baffle plates, turning vanes, flow dividers, perforated plate diffusers, gratings, grids, various types of deflector or distribution plates and the selective location thereof in the path of the incoming gas stream and the like have been suggested to enhance performance in the separation and collection of industrial dusts. Illustrative of some of such varied expedients are U.S. Pat. Nos. 4,227,903; 4,544,383; 4,655,804; 4,213,766; 3,926,595; 3,831,354; 3,831,350; 3,739,557 and 3,425,189. While most of such expedients have resulted in some degree of improved performance, the net results have fallen far short of optimum and the problem of achieving high efficiency and economic operation of industrial fabric filter dust collectors remains a continuing one.

One proposed solution is described in U.S. Pat. No. 5,030,261 to Giusti, which discloses two different series of vanes that are arranged to confront the incoming airstream, tends to reduce the velocity of air entering the filter housing. Another solution is described in U.S. Pat. No. 4,799,943 to Giusti et al., which discusses a gas distribution apparatus comprising a series of concentric rings of increasingly smaller diameter that are spaced apart from each other along the flow path. These rings tend to distribute the air stream evenly across the length of the flow path. The disclosure of each of these patents is hereby incorporated by reference herein in its entirety.

Even with these solutions being offered, there still exists, for some facilities, the need for improved air flow characteristics.

SUMMARY OF THE INVENTION

As a first aspect, embodiments of the present invention are directed to an air filtering unit for a factory. The air filtering unit comprises: an entry duct; a flow expander section fluidly connected with the entry duct, the flow expander section including a flow distribution unit and a flow velocity reduction unit; a filter unit fluidly connected with the flow expander section, the filter unit having a plurality of filter bags, the filter bags being suspended from a tube sheet; and an exit duct fluidly connected with the filter unit. The flow distribution unit comprises a series of flow distribution members positioned along a flow path, the flow distribution unit located and configured to substantially equally distribute an airstream along the length of the flow axis into a plurality of divided substreams. The flow velocity reduction unit includes a plurality of flow reduction members, each of the flow reduction members positioned and configured to confront at least one of the divided substreams and reduce the flow velocity thereof. In this configuration, the filter unit may be more efficient in removing particulate matter from the dirty airstream.

As a second aspect, embodiments of the present invention are directed to a method of filtering particulate matter from an airstream. The method comprises the steps of: passing an airstream containing particulate matter into a flow expander section of a filtering unit, the flow expander section including a flow distribution unit and a flow velocity reduction unit; subdividing the airstream with the flow distribution unit into a series of generally evenly distributed substreams; directing the substreams into the flow velocity reduction unit to reduce the flow velocity; directing the reduced velocity substreams into a filter unit fluidly connected with the flow expander section, the filter unit having a plurality of filter bags, the filter bags being suspended from a tube sheet; filtering the particulate matter from the substreams with the filter bags, such that the particulate matter remains outside of the bags and clean air flows inside the bags; and passing clean airstreams from inside the bags to an exit duct.

DETAILED DESCRIPTION OF EMBODIMENTS OF THE INVENTION

The present invention will now be described more fully hereinafter, in which preferred embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art. In the drawings, like numbers refer to like elements throughout. Thicknesses and dimensions of some components may be exaggerated for clarity.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein. Well-known functions or constructions may not be described in detail for brevity and/or clarity.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein the expression "and/or" includes any and all combinations of one or more of the associated listed items.

In addition, spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly.

Further, it will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

The invention involves the separation of particles from an airstream. The airstream as described veers, curves, bends, or otherwise deviates from a linear path. The position of structures comprising the illustrated embodiment of the invention will often be described herein as "upstream" or "downstream" of one another. As used herein, a structure being described as "upstream" of another structure means a flowing portion of the airstream reaches the first structure before reaching the second structure. Similarly, a structure being described as "downstream" of another structure means that a flowing portion of the airstream reaches the second structure prior to reaching the first structure.

Figure 1:
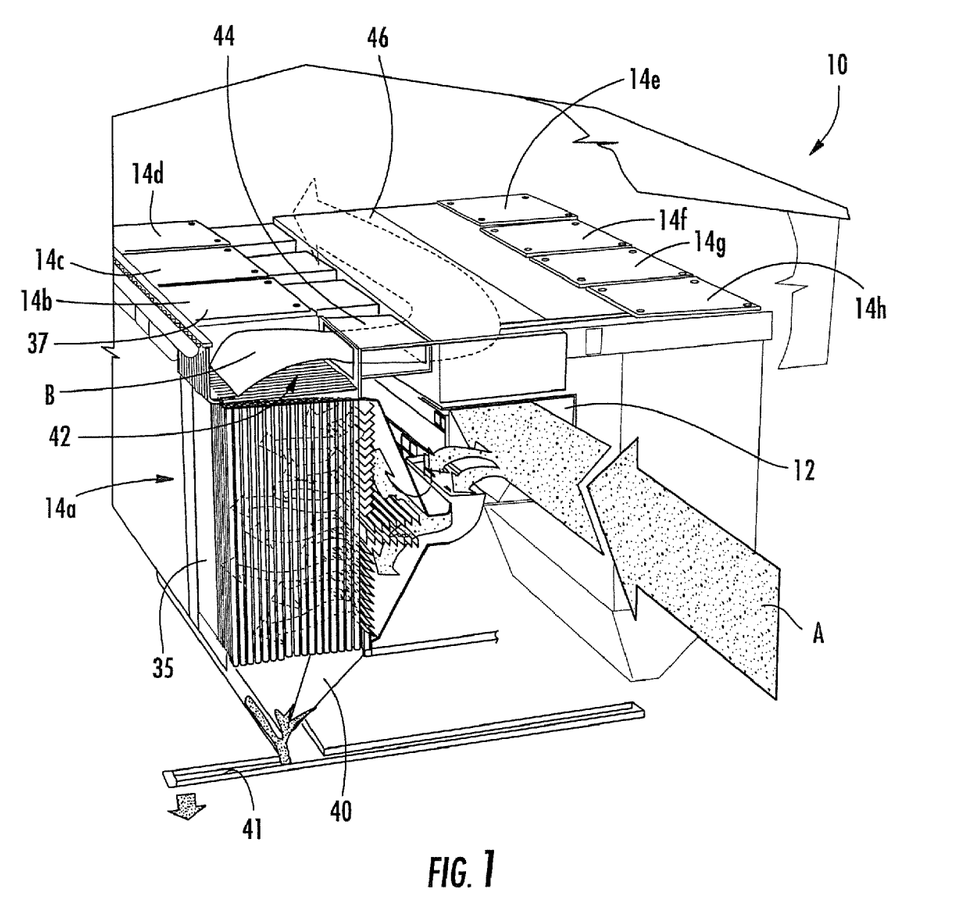
FIG. 1 is a perspective view of a portion of a baghouse that includes an airstream filtering system according to embodiments of the present invention.

Turning now to the drawings, a baghouse facility, designated broadly at 10, is shown in FIG. 1. The baghouse facility 10 is typically connected with a larger industrial plant or factory that, in the course of producing a product, generates an airstream with particulate matter therein. Exemplary plants include those producing cement or lime, steel mills, coal-fired boilers, and the like. Typically, the particulate-laden airstream includes particulates having a size distribution of between about 0.5 and 2.5 microns.

The baghouse facility 10 includes an inlet manifold 12 which receives the particulate-laden (or "dirty") airstream A from another process area within the plant. The dirty airstream A flows through one of eight filter units 14a-14h (in other embodiments of the invention, more or fewer filter units may be included). Once the dirty airstream A is filtered within the filter units 14a-14h, the clean airstream B proceeds from the filter units 14a-14h to an exit manifold 46, from which it is released to the atmosphere through a smokestack, chimney, or the like.

Figure 2:
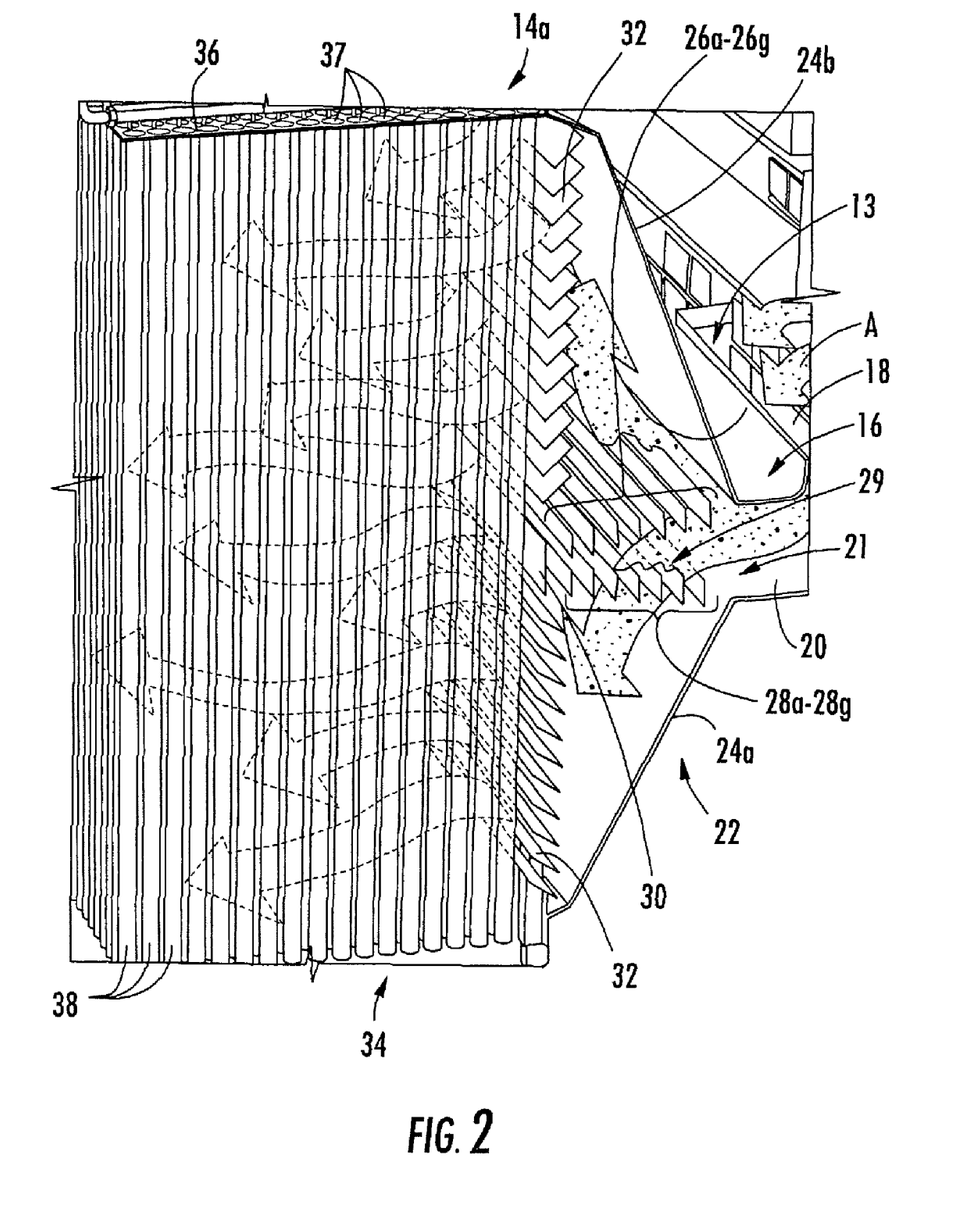
FIG. 2 is an enlarged perspective view of the airstream filtering system of FIG. 1.

Turning now to FIG. 2, an enlarged and more detailed view of the filter unit 14a is illustrated therein. The filter unit 14a is essentially identical to the other filter units 14b-14h (although this need not be the case); as such, only the filter unit 14*a* will be described herein, with the understanding that the description will be equally applicable to the other filter units 14*b*-14*h*.

Referring again to FIG. 2, the filter unit 14*a* includes an entry duct 16 that is routed away from the inlet manifold 12. The entry duct 16 has a vertical portion 18 that is fed by an opening 13 in the inlet manifold 12. The vertical portion 18 merges smoothly with a horizontal portion 20 that feeds the opening 21 of an expander section 22. The vertical and horizontal portions 18, 20 combine to reduce the velocity of the dirty airstream A prior to its entering the expander section 22.

The expander section 22 has diverging walls 24*a*, 24*b* that merge with the downstream end of the horizontal portion 20 of the entry duct 16 and lead away from the opening 21 that receives the dirty airstream A from the entry duct 16. A series of seven upper vanes 26*a*-26*g* are mounted within the expander section 22. The upper vanes 26*a*-26*g* are mounted such that, with increasing distance from the opening 21, the lower edge of each upper vane 26*b*-26*g* is lower than the preceding vane 26*a*-26*f*. Also, a series of lower vanes 28*a*-28*g* is mounted within the expander section 22 such that, with increasing distance from the opening 21, the upper edge of each lower vane 28*b*-28*g* is higher than the preceding vane 28*a*-28*f*. As a result, the gap 29 between each pair of vertically aligned upper and lower vanes 26*a*-26*g*, 28*a*-28*g* becomes slightly less with increasing distance from the opening 21 (i.e., along the flow path of the airstream A). Together, the upper and lower vanes 26*a*-26*g*, 28*a*-28*g* form a flow distribution unit 25. A terminal vane 30 is positioned downstream of the last pair of upper and vanes 26*g*, 28*g* and is substantially centered between the lower edge of the upper vane 26*g* and the upper edge of the lower vane 28*g*. In the illustrated embodiment, each of the upper and lower vanes 26*a*-26*g*, 28*a*-28*g* is disposed generally perpendicular to the flow direction of the dirty airstream A.

Referring still to FIG. 2, the filter unit 14*a* also includes a flow velocity reduction unit 31 comprising a series of baffles 32 that are generally vertically aligned above and below the terminal vane 30. The baffles 32 are disposed at an oblique angle relative to the terminal vane 30 (typically this angle is between about 30 and 60 degrees), with the downstream edge of the baffle 32 being positioned nearer to the terminal vane 30 than the upstream edge.

Referring once again to FIG. 2, a filter module 34 is positioned downstream of the baffles 32. The filter module 34 includes a tube sheet 36 that is positioned above the uppermost baffle 32. The tube sheet 36 is generally horizontally disposed and has an array of apertures 37. An elongate cylindrical filter bag 38 is mounted within each aperture 37 and is suspended from the filter plate 36. Each filter bag 38 is formed of an appropriate filter material, such as polyester, polyamide, glass, etc., that is selected to filter from the dirty airstream A the particulates contained therein. The construction of the filter bags 38 is well known to those skilled in this art and need not be described in detail herein.

Referring back to FIG. 1, the filter module 34 includes a particulate hopper 40 is positioned below the array of filter bags 38. The hopper 40 is funnel-shaped and leads to a particulate collection trough 41. Also, the filter module 34 is surrounded on its sides by side walls 35. An upper chamber 42 is defined by a ceiling 37, the upper portions of the side walls 35, and the filter plate 36. The upper chamber 42 feeds into an exit duct 44, which in turn feeds into the exit manifold 46 along with the exit ducts 44 of the other filter units 14*b*-14*h*.

Figure 3A:
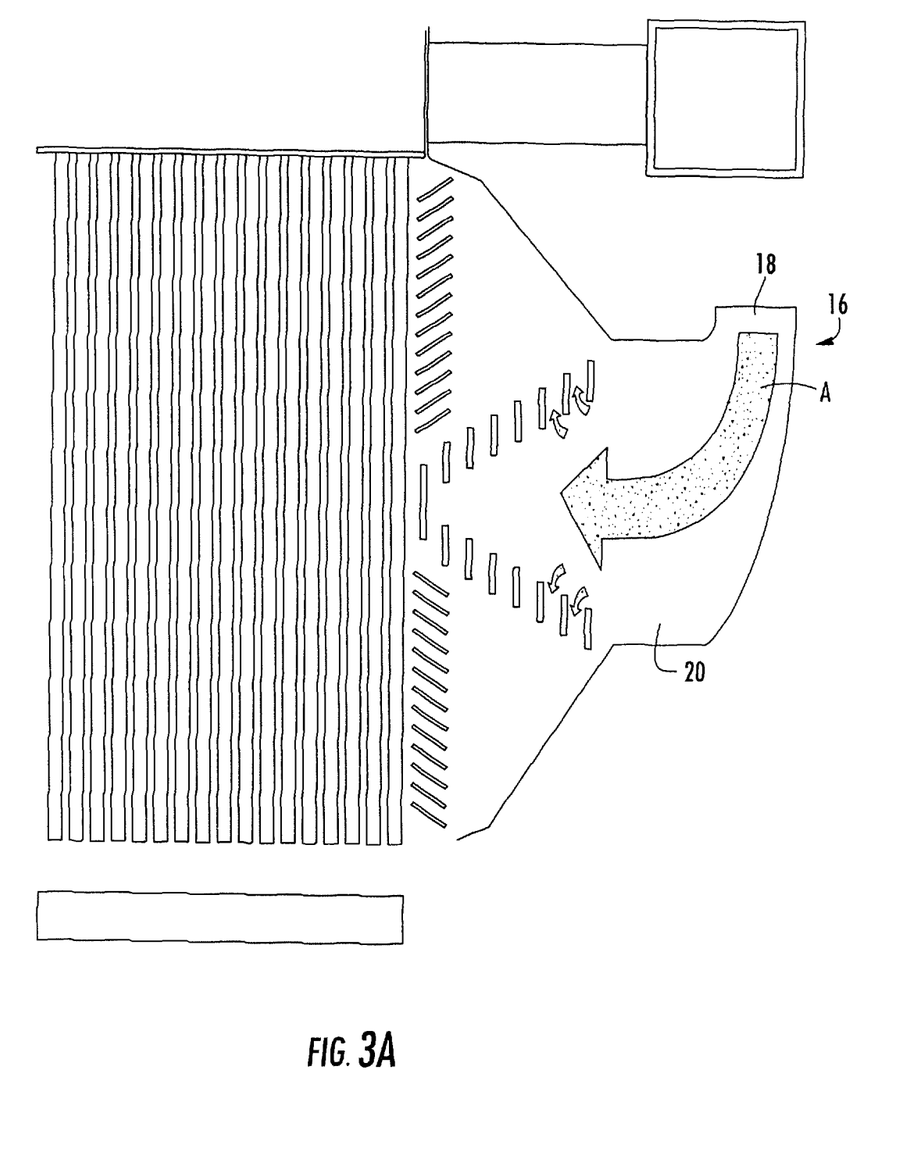
FIGS. 3A-3E are sequential views showing the filtering of particulates from a dirty airstream using the airstream filtering system of FIG. 1.

In operation, the dirty airstream A is directed into the inlet manifold 12 from the factory. Typically, the velocity of the dirty airstream A as it enters the inlet manifold 12 is between about 50 and 85 feet/sec. The dirty airstream A is divided to enter the filter units 14*a*-14*h* in generally equal portions through the respective entry ducts 16. The dirty airstream A flows down the vertical portion 18 of the entry duct 16, then horizontally in the horizontal portion 20. Thus, the dirty airstream A undergoes two different 90 degree changes of direction (i.e., from the inlet manifold 12 to the vertical portion 18 of the entry duct 16, and from the vertical portion 18 to the horizontal portion 20) in traveling from the inlet manifold 12 to the expander section 22. These 90 degree changes of direction can assist in reducing the velocity of the dirty airstream A between about 0 and 22 percent (see FIG. 3A).

Figure 3B:
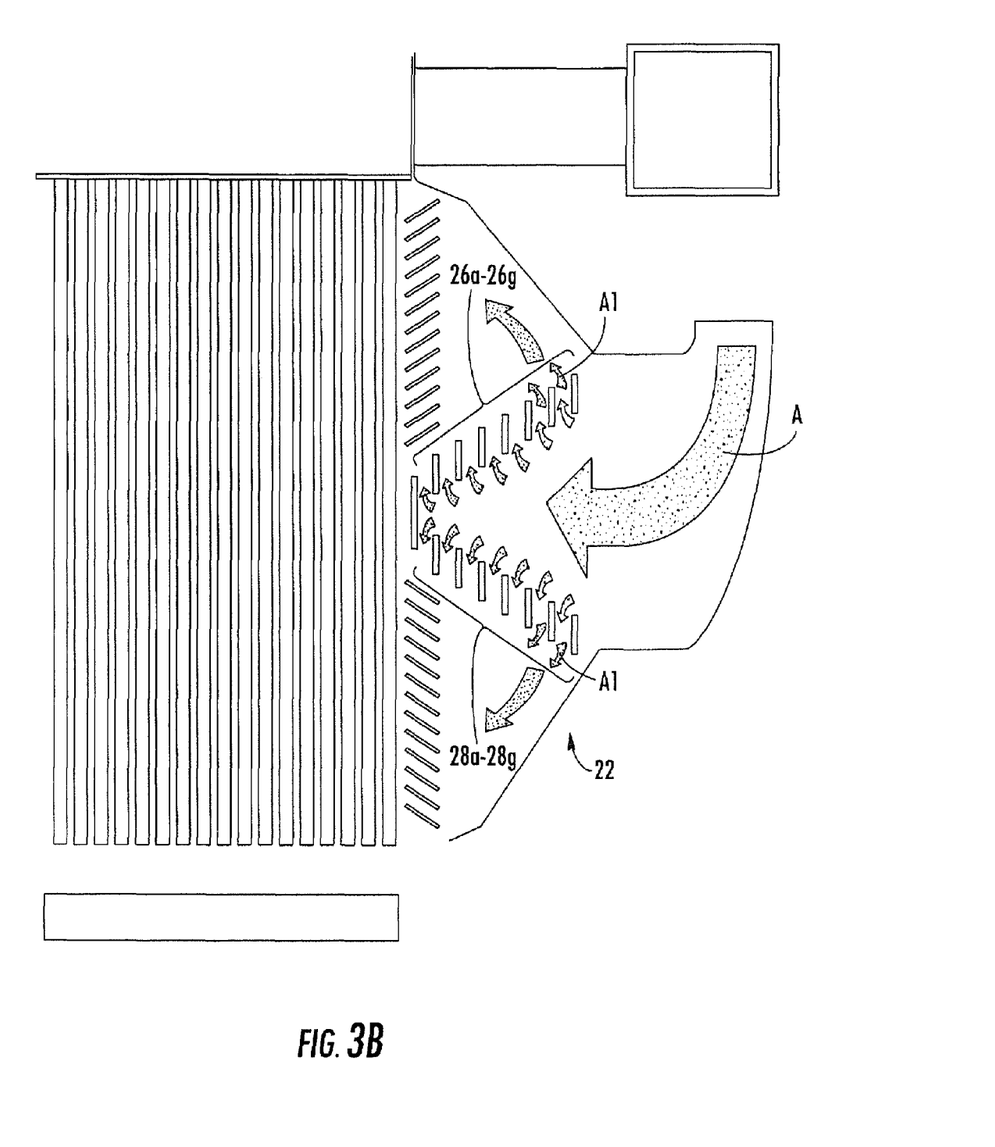

The dirty airstream A then flows from the entry duct 16 into the expander section 22. The volume of the expander section 22 reduces the velocity between about 60 and 90 percent. As the dirty airstream A reaches the upper and lower vanes 26*a*-26*g*, 28*a*-28*g*, the arrangement of the vanes tend to divide and distribute the dirty airstream A relatively evenly across the baffles 32 as a series of divided dirty substreams A1. This behavior is described in some detail in U.S. Pat. No. 4,799,943 to Giusti et al., supra, and need not be discussed in detail herein. Also, the interaction of the ditty airstream A with the vanes 26*a*-26*g*, 28*a*-26*g* can further reduce the velocity of the dirty substreams A1 (see FIG. 3B).

Figure 3C:
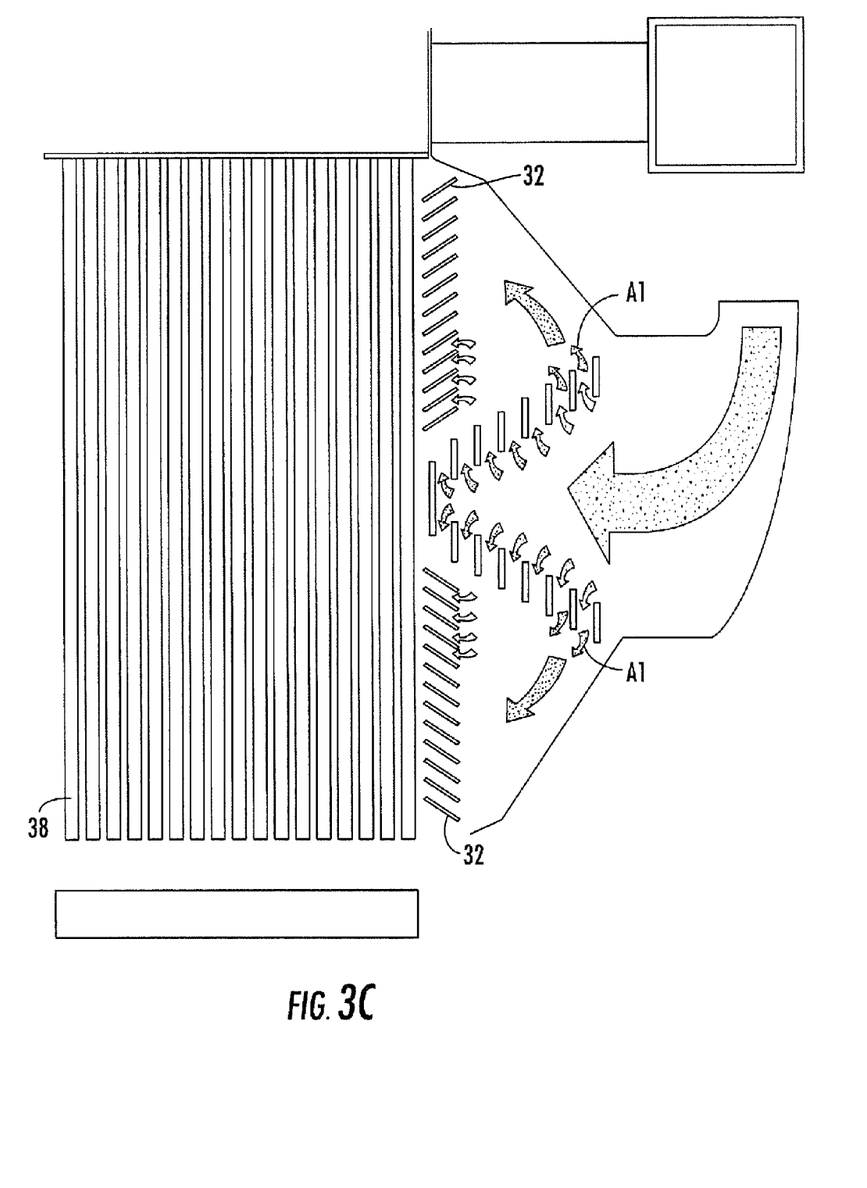
Figure 3D:
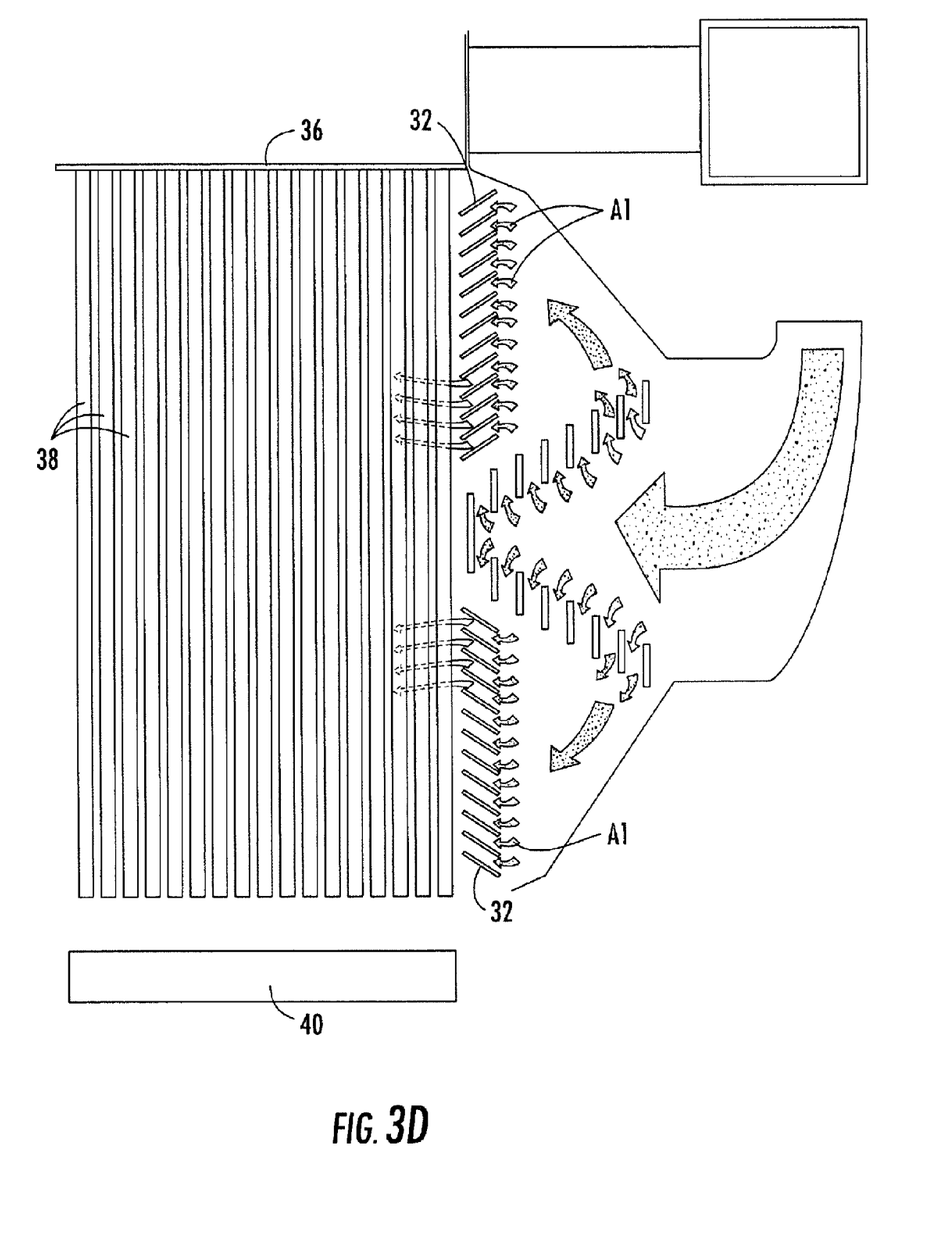

Referring now to FIGS. 3C and 3D, as the dirty substreams A1 reach the baffles 32, the oblique angle at which the baffles 32 are mounted (i.e., the dirty substreams A1 contact the baffles 32 almost flush) causes the divided dirty substreams A1 to lose additional velocity (typically between about 60 and 75 percent). Thus, by the time that the divided dirty substreams A1 reach the filter bags 38, the velocity of the dirty substreams A1 may be as low as 2 to 6 ft/sec.

Figure 3E:
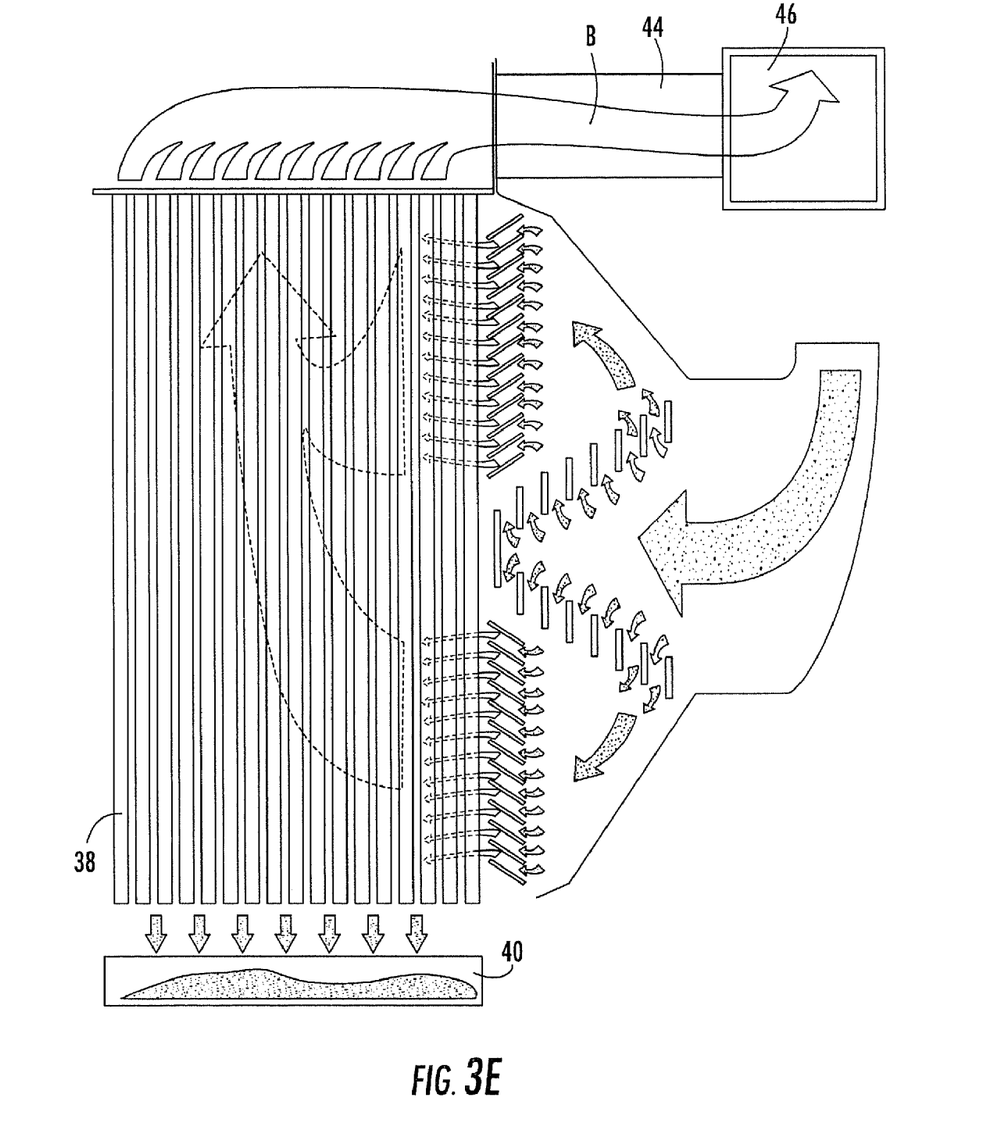

Referring now to FIGS. 3D and 3E, as the dirty substreams A1 reach the filter bags 38, the particulate matter in the dirty substreams A1 is filtered therefrom by the filter bags 38. The particulate matter either sticks to the outer surface of a filter bag 38 or falls into the hopper 40 (typically, the filter bags 38 are pulsed or the like periodically to clean the particulate matter from the outside surface of the bags 38). Because the velocity of the subairstreams A1 as they interact with the filter bags 38 is so low, there is little to disturb the particulate matter from falling into the hopper 40.

Referring again to FIG. 3E, the airstream, now devoid of particulate matter filtered by the filter bags 38, flows upwardly inside of the filter bags 38 to the upper chamber 42. The clean air then flows through the exit duct 44 and into the exit manifold 46 to rejoin the other clean airstreams exiting the other filter units 14*b*-14*h* to form an overall clean exhaust airstream B.

Those skilled in this art will recognize that alternatives to the illustrated embodiment may also be employed. For example, the numbers of upper and lower vanes 26*a*-26*g*, 28*a*-28*g* and/or baffles 32 may be increased or decreased as desired. As another alternative, the upper and lower vanes 26*a*-26*g*, 28*a*-28*g* may be replaced with rings (such as those shown in U.S. Pat. No. 4,799,943 to Giusti et al., supra) or other flow distribution members that decrease the velocity of the airstream and distribute it relatively equally for the baffles 32. Moreover, number of baffles 32 may be varied as desired, or other flow reduction members may be employed. The baffles 32 may be formed as separate components, or they may be formed from a single sheet of material and punched or struck out therefrom. In addition, the number of filter units 14*a*-14*h* may be varied as needed, as may be the number of filter bags 38 within each filter unit.

The combination of the dual 90 degree changes of direction, the upper and lower vanes in the expander section, and the baffles can reduce the velocity of the airstream between about 90 and 97 percent from the inlet manifold 12 to the filter unit 14*a*. Further, the illustrated configuration can significantly reduce the amount of space required for such velocity reduction.

The foregoing embodiments are illustrative of the present invention, and are not to be construed as limiting thereof. The invention is defined by the following claims, with equivalents of the claims to be included therein.

That which is claimed is:

1. An air filtering unit for a factory or industrial plant, comprising:
    an entry duct;
    a flow expander section fluidly connected with the entry duct, the flow expander section including a flow distribution unit and a flow velocity reduction unit;
    a filter unit fluidly connected with the flow expander section, the filter unit having a plurality of filter bags, the filter bags being suspended from a tube sheet; and
    an exit duct fluidly connected with the filter unit;
    wherein the flow distribution unit comprises a series of flow distribution members positioned along a flow path, the flow distribution unit located and configured to substantially equally distribute an airstream along the length of the flow axis into a plurality of divided substreams;
    wherein the flow velocity reduction unit is located downstream from the flow distribution unit and between the flow distribution unit and the filter unit and includes a plurality of flow reduction members, each of the flow reduction members positioned and configured to confront at least one of the divided substreams and reduce the flow velocity thereof; and
    wherein the flow distribution members comprise sets of upper and lower vanes.

2. The air filtering unit defined in claim 1, wherein the upper and lower vanes are oriented to be substantially perpendicular to the flow path.

3. The air filtering unit defined in claim 2, wherein the upper vanes have lower edges, the lower vanes have upper edges, the lower edges of the upper vanes are positioned successively lower downstream of the flow path, and the upper edges of the lower vanes are positioned successively higher downstream of the flow path.

4. The air filtering unit defined in claim 1, wherein the flow velocity reduction unit comprises a plurality of baffles.

5. The air filtering unit defined in claim 4, wherein the baffles are oriented to be generally perpendicular to at least one of the divided substreams.

6. The air filtering unit defined in claim 1, wherein the entry duct comprises a vertical section and a horizontal section that merges and is fluidly connected with the vertical section.

7. The air filtering unit defined in claim 6, wherein the vertical section is adapted to receive the airstream from an inlet manifold, and wherein the horizontal section feeds into the flow expander section.

8. A method of filtering particulate matter from an airstream, comprising the steps of:
    passing an airstream containing particulate matter into a flow expander section of a filtering unit, the flow expander section including a flow distribution unit and a flow velocity reduction unit;
    subdividing the airstream with the flow distribution unit into a series of generally evenly distributed substreams;
    directing the substreams downstream into the flow velocity reduction unit to reduce the flow velocity;
    directing the reduced velocity substreams into a filter unit fluidly connected with the flow expander section, the filter unit having a plurality of filter bags, the filter bags being suspended from a tube sheet, wherein the flow velocity reduction unit is located between the flow distribution unit and the filter unit;
    filtering the particulate matter from the substreams with the filter bags, such that the particulate matter remains outside of the bags and clean air flows inside the bags; and
    passing clean airstreams from inside the bags to an exit duct;
    wherein the flow distribution unit comprises a series of flow distribution members positioned along a flow path, the flow distribution unit located and configured to substantially equally distribute the airstream along the length of the flow path into the substreams;
    wherein the flow velocity reduction unit includes a plurality of flow reduction members, each of the flow reduction members positioned and configured to confront at least one of the substreams and reduce the flow velocity thereof; and
    wherein the flow distribution members comprise sets of upper and lower vanes.

9. The method defined in claim 8, wherein the airstream includes particulate matter from an industrial plant.

10. The method defined in claim 9, wherein the industrial plant is a cement plant.

11. The method defined in claim 8, wherein the airstream entering the flow expander section has a velocity of between about 50 and 85 ft/sec.

12. The method defined in claim 11, wherein the substreams entering the filter unit have a velocity of between about 2 and 6 ft/sec.

13. The method defined in claim 8, wherein the upper and lower vanes are oriented to be substantially perpendicular to the flow path.

14. The method defined in claim 13, wherein the upper vanes have lower edges, the lower vanes have upper edges, the lower edges of the upper vanes are positioned successively lower downstream of the flow path, and the upper edges of the lower vanes are positioned successively higher downstream of the flow path.

15. The method defined in claim 8, wherein the flow velocity reduction unit comprises a plurality of baffles.

16. The method defined in claim 15, wherein the baffles are oriented to be generally perpendicular to at least one of the divided substreams.

17. The method defined in claim 8, wherein the entry duct comprises a vertical section and a horizontal section that merges and is fluidly connected with the vertical section.

18. The air filtering unit of claim 1 wherein:
    the flow distribution members comprise sets of upper and lower vanes; and
    the flow velocity reduction unit comprises a plurality of baffles downstream from the sets of upper and lower vanes.

19. The air filtering unit of claim 18 wherein:
    the upper and lower vanes are oriented to be substantially perpendicular to the flow path; and
    each of the baffles is oriented to be generally perpendicular to at least one of the divided substreams.

20. The air filtering unit of claim 18 wherein the baffles are oriented at a different angle than the upper and lower vanes.

21. The air filtering unit of claim 18 wherein:
the flow distribution members include a terminal vane downstream from the upper and lower vanes; and
the baffles are disposed at an oblique angle relative to the terminal vane.

22. An air filtering unit for a factory or industrial plant, comprising:
an entry duct;
a flow expander section fluidly connected with the entry duct, the flow expander section including a flow distribution unit and a flow velocity reduction unit;
a filter unit fluidly connected with the flow expander section, the filter unit having a plurality of filter bags, the filter bags being suspended from a tube sheet; and
an exit duct fluidly connected with the filter unit;
wherein the flow distribution unit comprises a series of flow distribution members positioned along a flow path, the flow distribution unit located and configured to substantially equally distribute an airstream along the length of the flow axis into a plurality of divided substreams; and
wherein the flow velocity reduction unit is located downstream from the flow distribution unit and between the flow distribution unit and the filter unit and includes a plurality of flow reduction members, each of the flow reduction members positioned and configured to confront at least one of the divided substreams and reduce the flow velocity thereof;
wherein the entry duct comprises a vertical section and a horizontal section that merges and is fluidly connected with the vertical section, the vertical section is adapted to receive the airstream from an inlet manifold, the horizontal section feeds into the flow expander section, and the flow expander section is located downstream of the horizontal section.

23. The air filtering unit of claim 22 wherein a flow cross-section of the horizontal section is greater than that of the vertical section.

\* \* \* \* \*